US008040886B2

(12) United States Patent
Marshall et al.

(10) Patent No.: US 8,040,886 B2
(45) Date of Patent: Oct. 18, 2011

(54) PROGRAMMABLE PACKET CLASSIFICATION SYSTEM USING AN ARRAY OF UNIFORM CONTENT-ADDRESSABLE MEMORIES

(75) Inventors: John W. Marshall, Cary, NC (US);
Russell E. Schroter, Cary, NC (US);
Herman Levenson, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1339 days.

(21) Appl. No.: 10/408,987

(22) Filed: Apr. 8, 2003

(65) Prior Publication Data

US 2004/0213235 A1    Oct. 28, 2004

(51) Int. Cl.
*H04L 12/28* (2006.01)
(52) U.S. Cl. ............... 370/392; 370/395.32; 370/235
(58) Field of Classification Search ............... 370/392, 370/400, 389, 395.21, 394, 395.42
See application file for complete search history.

(56) References Cited

U.S. PATENT DOCUMENTS

| | | | |
|---|---|---|---|
| 5,740,171 A | 4/1998 | Mazzola et al. | |
| 5,852,607 A | 12/1998 | Chin | |
| 5,852,630 A * | 12/1998 | Langberg et al. | 375/219 |
| 5,872,783 A | 2/1999 | Chin | |
| 5,959,989 A | 9/1999 | Gleeson et al. | |
| 5,964,841 A | 10/1999 | Rekhter | |
| 6,032,194 A | 2/2000 | Gai et al. | |
| 6,081,522 A * | 6/2000 | Hendel et al. | 370/389 |
| 6,088,356 A * | 7/2000 | Hendel et al. | 370/392 |
| 6,188,694 B1 | 2/2001 | Fine et al. | |
| 6,208,649 B1 | 3/2001 | Kloth | |
| 6,212,183 B1 | 4/2001 | Wilford | |
| 6,236,658 B1 | 5/2001 | Essbaum et al. | |
| 6,266,705 B1 | 7/2001 | Ullum et al. | |
| 6,335,932 B2 * | 1/2002 | Kadambi et al. | 370/391 |
| 6,377,577 B1 | 4/2002 | Bechtolsheim et al. | |
| 6,430,188 B1 * | 8/2002 | Kadambi et al. | 370/398 |
| 6,430,190 B1 | 8/2002 | Essbaum et al. | |
| 6,449,650 B1 * | 9/2002 | Westfall et al. | 709/228 |
| 6,467,019 B1 * | 10/2002 | Washburn | 711/108 |

(Continued)

FOREIGN PATENT DOCUMENTS

EP    1 128 609 A2    8/2001

(Continued)

OTHER PUBLICATIONS

Brown, R., Calendar Queues: A Fast 0(1) Priority Queue Implementation for the Simulation Event Set Problem, Communications of the ACM, vol. 31, No. 10, Oct. 1988, pp. 1220-1227.

(Continued)

*Primary Examiner* — Dang Ton
*Assistant Examiner* — Brian O Connor
(74) *Attorney, Agent, or Firm* — Cesari and McKenna, LLP

(57) ABSTRACT

A versatile and efficient technique for classifying packets in an intermediate node. According to the technique, criteria and rules associated with the packet are applied to one or more classification stages containing content-addressable memories (CAMs). Each stage examines specific criteria associated with the packet, e.g., a packet field, and generates a rule and additional criteria. The additional rule and criteria are provided to the next classification stage. This process continues until a final rule is provided to a final classification stage. At the final classification stage, the final rule is used to generate an identifier, e.g., queue identifier (ID), associated with the classified packet.

33 Claims, 11 Drawing Sheets

U.S. PATENT DOCUMENTS

| | | |
|---|---|---|
| 6,515,963 B1 | 2/2003 | Bechtolsheim et al. |
| 6,526,474 B1 | 2/2003 | Ross |
| 6,587,463 B1 * | 7/2003 | Hebb et al. .................. 370/392 |
| 6,718,326 B2 * | 4/2004 | Uga et al. .............................. 1/1 |
| 6,850,521 B1 * | 2/2005 | Kadambi et al. ............. 370/389 |
| 6,901,592 B2 * | 5/2005 | Mar et al. ..................... 718/102 |
| 6,980,555 B2 * | 12/2005 | Mar ......................... 370/395.21 |
| 7,002,965 B1 * | 2/2006 | Cheriton ................. 370/395.32 |
| 7,023,852 B1 * | 4/2006 | Mar et al. ..................... 370/392 |
| 7,031,297 B1 * | 4/2006 | Shabtay et al. .............. 370/352 |
| 7,103,055 B2 * | 9/2006 | Kadambi et al. ............. 370/409 |
| 7,130,903 B2 * | 10/2006 | Masuda et al. ............... 709/225 |
| 7,170,891 B2 * | 1/2007 | Messenger .................... 370/392 |
| 7,193,997 B2 * | 3/2007 | Van Lunteren et al. ....... 370/392 |
| 7,394,809 B2 * | 7/2008 | Kumar et al. ................. 370/392 |
| 7,606,248 B1 * | 10/2009 | Maturi et al. ................ 370/412 |
| 7,719,980 B2 * | 5/2010 | Lee et al. ...................... 370/235 |
| 2002/0023080 A1 * | 2/2002 | Uga et al. .......................... 707/1 |
| 2004/0213275 A1 * | 10/2004 | Basso et al. .................. 370/411 |

FOREIGN PATENT DOCUMENTS

| | | |
|---|---|---|
| EP | 1 180 882 A2 | 2/2002 |
| WO | WO 01/08360 A1 | 2/2001 |

OTHER PUBLICATIONS

"Notification of Transmittal of the International Search Report and the Written Opinion of the International Searching Authority, or the Declaration" for International application No. PCT/US2004/010771, International filing date of Jun. 4, 2004.

"Written Opinion of the International Searching Authority" for International application No. PCT/US2004/010771, International filing date of Jun. 4, 2004.

* cited by examiner

US 8,040,886 B2

PROGRAMMABLE PACKET CLASSIFICATION SYSTEM USING AN ARRAY OF UNIFORM CONTENT-ADDRESSABLE MEMORIES

BACKGROUND OF THE INVENTION

1. Field of the Invention

This invention relates to computer networks and more specifically to classifying packets transferred over a computer network.

2. Background Information

A computer network is a geographically distributed collection of interconnected network links and segments for transporting data between nodes, such as computers. Many types of network segments are available, with the types ranging from local area networks (LANs) to wide area networks (WANs). End nodes, such as personal computers or workstations, typically communicate over the network by exchanging discrete frames or packets of data according to predefined protocols. In this context, a protocol consists of a set of rules defining how the nodes interact with each other.

Computer networks may be further interconnected by an intermediate node, such as a switch or router, having a plurality of ports, which may be coupled to the networks. For example, a switch may be utilized to provide a "switching" function for transferring information between a plurality of LANs at high speed. The switching function includes receiving a data packet that originated from a source node at a source port and transferring that packet to at least one destination port for forwarding to a destination node.

A router may also be used to interconnect LANs executing different LAN standards and/or to provide higher level functionality than a switch. If the LAN standards associated with the source and destination nodes are dissimilar (e.g., Ethernet and token ring), the router may also alter the format of the packet so that it may be received by the destination node. Routers typically operate at the network layer of a communications protocol stack used by the network, such as the internetwork layer of the Transmission Control Protocol/Internet Protocol (TCP/IP) communications architecture.

To interconnect dispersed computer networks and/or provide Internet connectivity, many organizations rely on the infrastructure and facilities of Internet Service Providers (ISPs). ISPs typically own one or more backbone networks that are configured to provide high-speed connection to the Internet. To interconnect private networks that are geographically diverse, an organization may subscribe to one or more ISPs and couple each of its private networks to the ISPs equipment. Here, a router may be utilized to interconnect a plurality of private networks to an IP backbone network.

Typically, high-speed input links of the private networks couple to input ports of the router that feed to a single output buffer connected to a shared output link coupled to the IP backbone network. The router may function to aggregate different kinds of packet traffic (e.g., high-priority packet traffic versus lower-priority packet traffic) over the shared output link and different qualities of service (QoS) may also be required for packets transferred over the shared link. For example, packets containing voice information (voice packets) may require a higher quality of service than packets that simply contain data information, such as data contained in a file.

One way to implement QoS is to enable packets to be classified such that certain packets, e.g., voice packets, are guaranteed an established level of service. One prior technique for classifying packets in this manner involves classification rules and content-addressable memory (CAM) hardware. According to this technique a set of classification rules are defined and the CAMs are configured to implement the rules. A packet is classified by applying various content contained in a packet to the CAM. The output of the CAM, e.g., an address, is then used to make a QoS decision, which might include placing the packet on a particular calendar queue for transfer at a specific time.

One problem with the above-described technique, however, is that it tends not to scale well as the CAM typically must contain at least $2^n$ entries of n size where n is the size in bits of the packet's content that is applied to the CAM. Thus for example, if classification is based on a single 8-bit field within the packet, the CAM must contain at least 256 8-bit entries. Likewise, if the classification is based on three 8-bit fields contained within the packet, the CAM must contain at least 16,777,216 24-bit entries; thus forcing the CAM to have a capacity that is capable of holding at least 50,331,648 bytes of information. Conventional CAMs with such capacity are either not readily available or prohibitively expensive.

SUMMARY OF THE INVENTION

The present invention relates to a versatile and efficient technique for classifying packets in an intermediate node. According to the technique, information associated with a packet, e.g., a virtual local area network (VLAN) identifier (ID) and/or destination port ID, is provided to an initial classification stage of a classification engine which generates a criterion, e.g., a packet field, and a rule associated with the packet. The generated criterion and rule are provided to an intermediate classification stage of the engine, containing is one or more content-addressable memories (CAM) stages. Each CAM stage comprises a plurality of CAMs coupled to supporting logic configured to apply information associated with the criterion and the rule to the CAMs and generate a rule and criterion that is provided to a next CAM stage (if any). The process continues until a final CAM stage generates a final rule. The final rule is provided to a final classification stage of the engine, which generates an identifier (ID), associated with the classified packet.

In the illustrated embodiment, the initial classification stage comprises a VLAN table, a port/channel table, and an initial state generator, the intermediate stage comprises the one or more CAM stages, and the final classification stage comprises final stage logic and a final state table. The VLAN ID and destination port ID information associated with the packet are applied to the VLAN and port/channel tables, respectively, to generate a set of queue ID base pointers, packet field values, packet field valid values, and rules. The base pointers are transferred to the final state logic. The rules, packet field values, and packet field valid values are applied to the initial state generator, which generates a second rule and a second packet field value (criterion) that are provided to a first CAM stage contained in the intermediate classification stage.

Using the second rule and second packet field value, the first CAM stage generates a third rule and third packet field value (criterion) that is provided to a next CAM stage and classification rule priority and classification rule satisfied values that are provided to the final state logic. This process continues with successive CAM stages until the final rule is generated at the last CAM stage. The final rule is provided to the final state logic, which generates a final state table index using the final rule, classification rule priority values, and classification rule satisfied values. The final state table index is applied to the final state table to select a final state table entry. Information contained in the selected final state table entry is combined with the queue ID base pointers to generate the identifier, i.e., a queue ID, associated with the classified packet.

Advantageously, by classifying the packet in stages where each stage examines a particular criterion associated with the packet, the present invention enables conventional is CAM devices to be used to classify the packet where otherwise these devices may not be practical.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
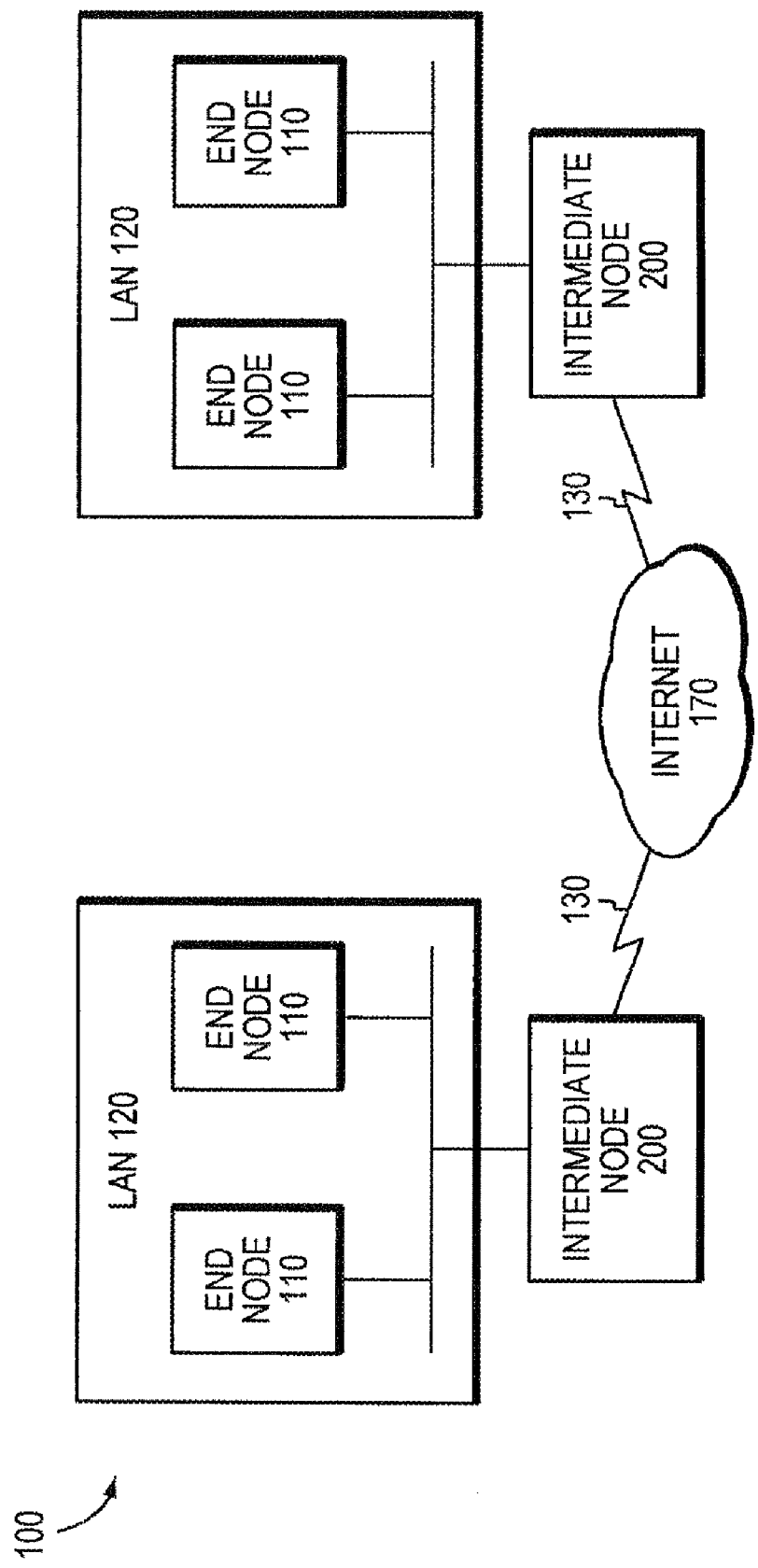
FIG. 1 is a schematic block diagram of a network that may be advantageously used with the present invention.

FIG. 1 is a schematic block diagram of a computer network 100 that may be advantageously used with the present invention. The computer network 100 comprises a collection of communication links and segments connected to a plurality of nodes, such as end nodes 110 and intermediate nodes 200. The network links and segments may comprise local area networks (LANs) 120, wide area networks (WANs), such as Internet 170 and WAN links 130 interconnected by intermediate nodes 200 to form an internetwork of computer nodes. These internetworked nodes communicate by exchanging data packets according to a predefined set of protocols, such as the Transmission Control Protocol/Internet Protocol (TCP/IP) and the Internetwork Packet exchange (IPX) protocol.

Figure 2:
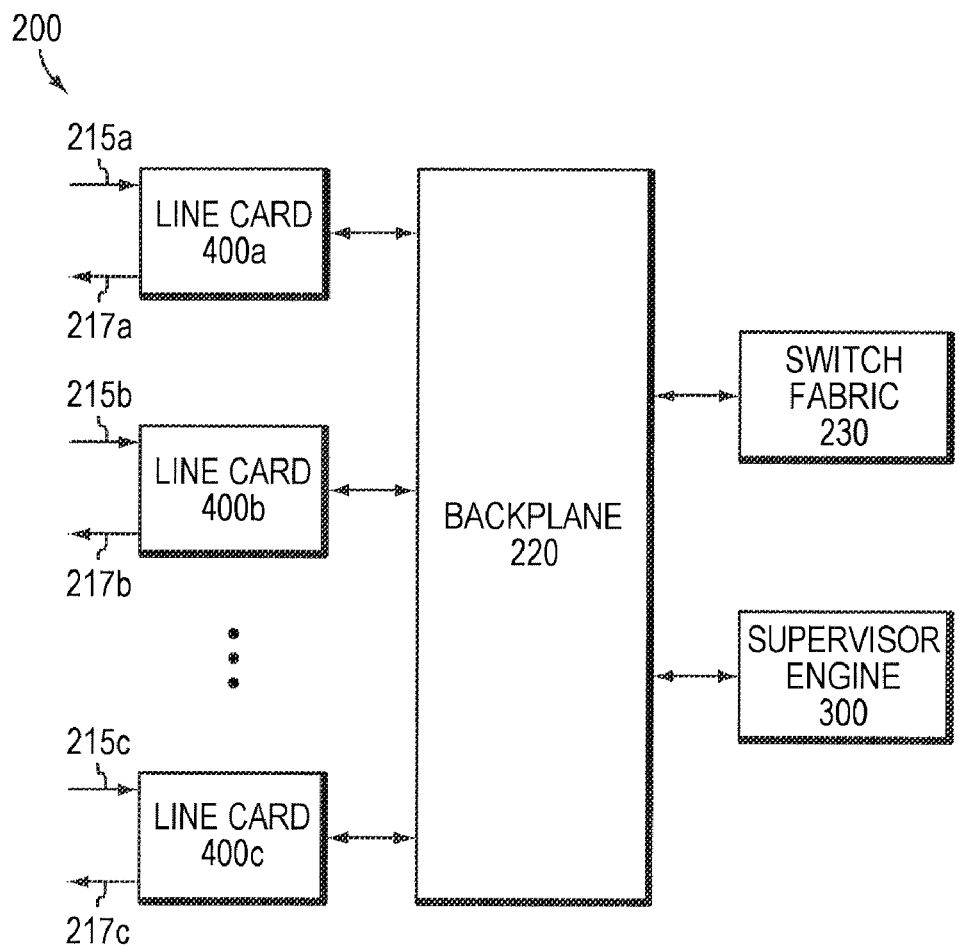
FIG. 2 is a high-level schematic block diagram of an exemplary intermediate node that may be advantageously used with the present invention.

FIG. 2 is a high-level schematic block diagram of intermediate node 200 that may be advantageously used with the present invention. A suitable intermediate node for use with the present invention includes the Cisco Catalyst 6500 Series Router available from Cisco Systems Incorporated, San Jose, Calif. Intermediate node 200 comprises one or more line cards 400, a switch fabric card 230, and a supervisor engine card 300 interconnected by a backplane 220. Node 200 is configured to perform, inter alia, various conventional switching and routing functions including switching and routing data (e.g., packets), support various combinations of communication protocols including, e.g., TCP/IP, Ethernet, Asynchronous Transfer Mode (ATM), and multi-channel T3, and notably classify packets in accordance with the inventive technique.

The backplane 220 comprises logic and a point-to-point-interconnect backplane that interconnects the various cards and allows data and signals to be transferred from one card to another. The switch fabric 230 is a conventional switch fabric device configured to operate in conjunction with the line cards 400 and supervisor engine 300 to improve system bandwidth. The supervisor engine 300 comprises logic that is, inter alia, configured to manage node 200 and process various packets received by the line cards 400. The line cards 400 comprise logic that interfaces node 200 with the network. The interface logic may include, e.g., ATM, FE, and GE ports, each of which includes conventional interface circuitry that may incorporate the signal, electrical and mechanical characteristics, and interchange circuits, needed to interface with the physical media and protocols running over that media. Moreover, each line card 400 contains logic that processes packets in accordance with the inventive technique.

Figure 3:
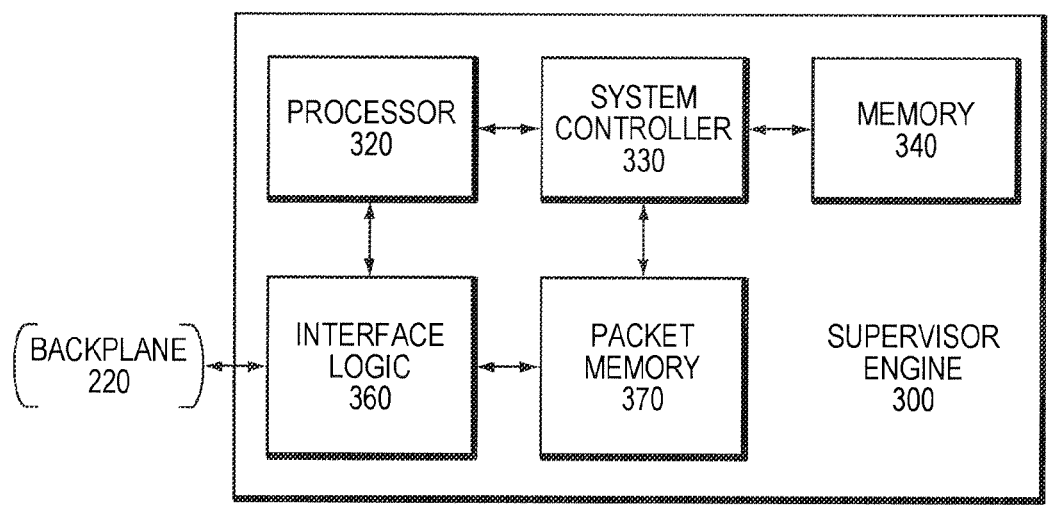
FIG. 3 is a partial schematic block diagram of a supervisor engine that may be advantageously used with the present invention.

FIG. 3 is a partial schematic block diagram of a supervisor engine that may be advantageously used with the present invention. Supervisor engine 300 comprises a processor 320, system controller 330, interface logic 360, and various memories. The memories comprise random access memory (RAM) locations addressable by the system controller 330 and interface logic 360 for storing data structures, packets, and software programs. An operating system, portions of which are typically resident in memory and executed by the processor 320, functionally organizes node 200 by, inter alia, invoking network operations in support of software processes executing on node 200.

Interface logic 360 is coupled to a packet memory 370 and the backplane 220, and is configured to transfer packets between the backplane 220 and the packet memory 370. Moreover, interface logic 360 is coupled to processor 320 and contains logic that notifies the processor 320 when a packet has been received from the backplane and is placed in packet memory 370. Packet memory 370 is a high-speed memory capable of holding packets received by the interface logic 360. Preferably, memory 370 comprises industry standard high-speed memory storage devices, such as Rambus Dynamic Random Access Memory (RDRAM) devices available from Rambus, Inc., Los Altos, Calif.

Processor memory 340 is illustratively a 128 Megabyte (Mb) memory implemented using Dynamic Random Access Memory (DRAM) devices and contains various software and data structures used by processor 320 to make, e.g., forwarding decisions based on information contained in the packets held in packet memory 370. These data structures may include one or more Forwarding Information Base (FIB) tables that contain various forwarding information, such as virtual local area network (VLAN) ID, destination port ID and destination channel ID information. System controller 330 is coupled to processor 320, memory 340 and packet memory 370, and is configured to enable processor 320 to access (e.g., read, write) these memories.

Processor 320 is a conventional routing processor configured, inter alia, to process packets received by interface logic 360. An example of a processor that may be advantageously used with the invention is the RM7000 processor available from PMC-Sierra, Inc., Santa Clara, Calif. Processing performed by processor 320 may include applying information contained in the packets to the FIB tables to make forwarding decisions associated with a particular packet, including determining a VLAN ID and destination port ID associated with the packet, as well as directing interface logic 360 to transfer packets contained in the packet memory 370 to the backplane 220.

Figure 4:
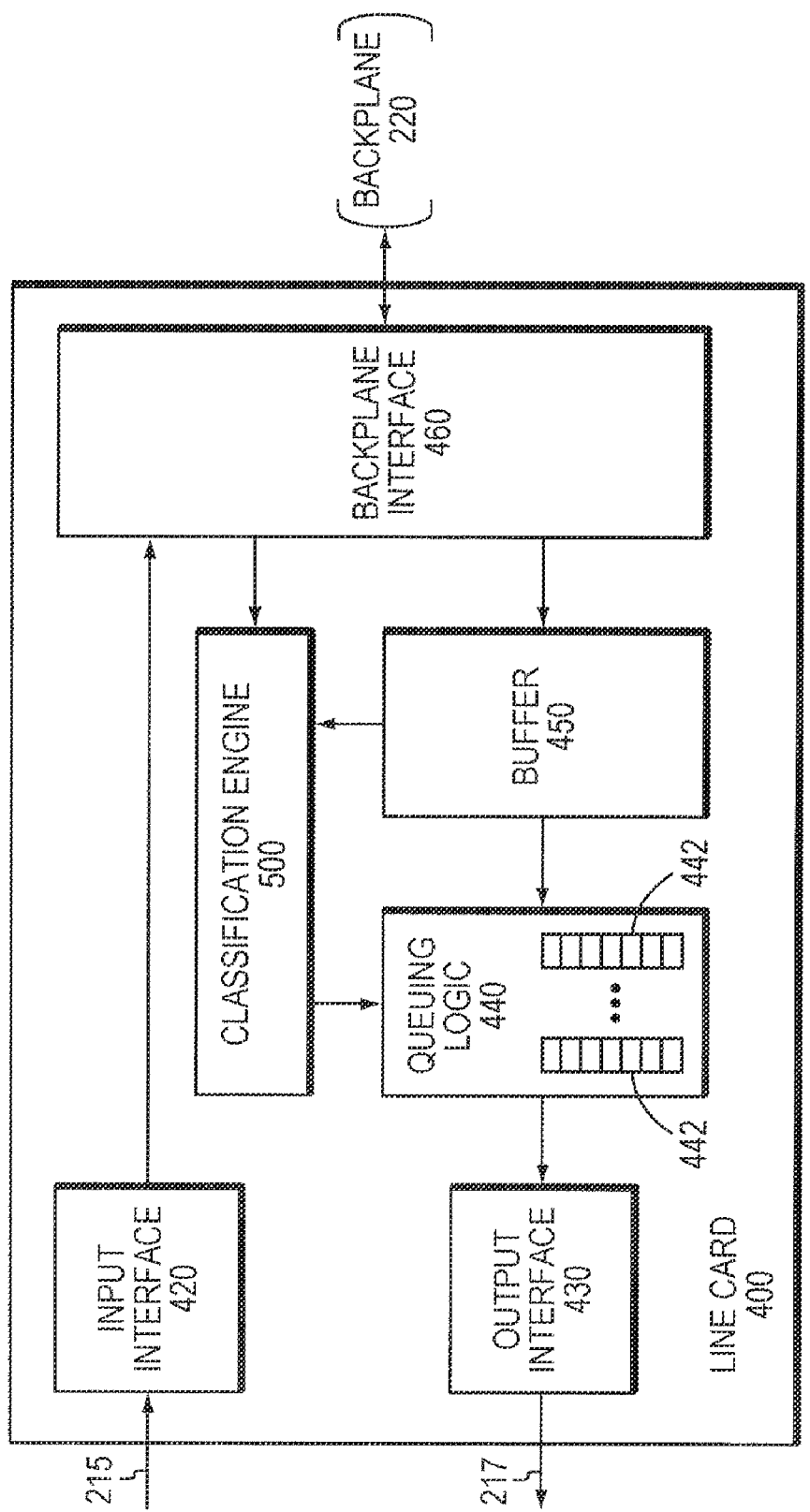
FIG. 4 is a partial schematic block diagram of a line card that may be advantageously used with the present invention.

FIG. 4 is a partial schematic block diagram of a line card 400 that may be advantageously used with the present invention. Line card 400 comprises an input interface 420, a backplane interface 460, a buffer 450, queuing logic 440, an output interface 430, and a classification engine 500. The input interface 420 is coupled to backplane interface 460 and configured to receive data (e.g., packets) from the network and transfer the data to the backplane interface 460 for transfer over the backplane 220. The backplane interface 460 contains logic that couples the line card to the backplane 220 and is configured to transfer data between the backplane 220 and the line card 400. Buffer 450 contains logic that enables data received from the backplane interface 460 to be held while processed by the classification engine 500 and queuing logic 440. The queuing logic 440 contains one or more output calendar queues 442 that hold packet information, such as pointers to packets contained in buffer 450. The classification engine 500 comprises logic that classifies packets contained in buffer 450, in accordance with the inventive technique, and generates a queue ID that is used to select a queue 442 associated with a classified packet.

A calendar queue, as used herein, is a fast priority queue having N entries with width w, or covering w time. Items are placed in the calendar queue according to a priority associated with the items where an item with priority p greater than the current priority is placed in entry n in accordance with the following formula:

$$n = (p/w) \% N$$

wherein "%" is the modulus operator.

Refer now to FIGS. 2-4 for a description of the operation of intermediate node 200. Assume a packet received from the network by the line card 400 at an input port 215 is transferred to input interface 420. Input interface 420 transfers the packet to the backplane interface 460, which forwards the packet to the supervisor engine 300 over backplane 220. The supervisor engine 300 receives the packet at interface logic 360, which places the packet in packet memory 370 and notifies processor 320 that the packet has been received. Processor 320 processes the packet including issuing requests to the system controller 330 to examine the packet and apply information contained in the packet to the FIBs in memory 340 to make a forwarding decision. This forwarding decision may include identifying a destination line card that is to receive the packet and identifying forwarding information (e.g., a VLAN ID and a destination port ID) associated with the packet. The processor 320 then directs the interface logic 360 to transfer the packet and associated forwarding information over backplane 220 to the switching fabric 230. The switching fabric 230 switches the packet and forwarding information to the destination line card 400. The destination line card 400 receives the packet and forwarding information at interface 460, places the packet in buffer 450, and applies the forwarding information to the classification engine 500. The classification engine 500 processes the packet including classifying the packet and determining a queue ID of a calendar queue 442 associated with the classified packet. The queue ID is transferred to the queuing logic 440 which selects a calendar queue 442 associated with the queue ID and places information associated with the packet (e.g., a pointer to the packet in buffer 450) on the selected queue 442. When the information associated with the packet reaches the head of the selected queue 442, the queuing logic 440 transfers the packet from buffer 450 to the output interface 430 where it is transferred out the destination port 217, associated with the destination port ID, onto the network.

The present invention relates to a versatile and efficient technique for classifying packets in intermediate node 200. Broadly stated, a criterion and rule associated with the packet are provided to an intermediate classification stage of the classification engine 500 containing one or more content-addressable memory (CAM) stages. Each stage examines a specific criterion associated with the packet, e.g., a packet field, applies the rule and the examined criterion to one or more CAMs to generate an additional rule and an additional criterion. The additional rule and the additional criterion are provided to a next CAM stage (if present). This process continues until a last CAM stage generates a final rule, which is provided to a final classification stage of the engine 500. At the final classification stage, the final rule is used to generate an identifier (ID), e.g., a queue ID, associated with the classified packet.

Figure 5:
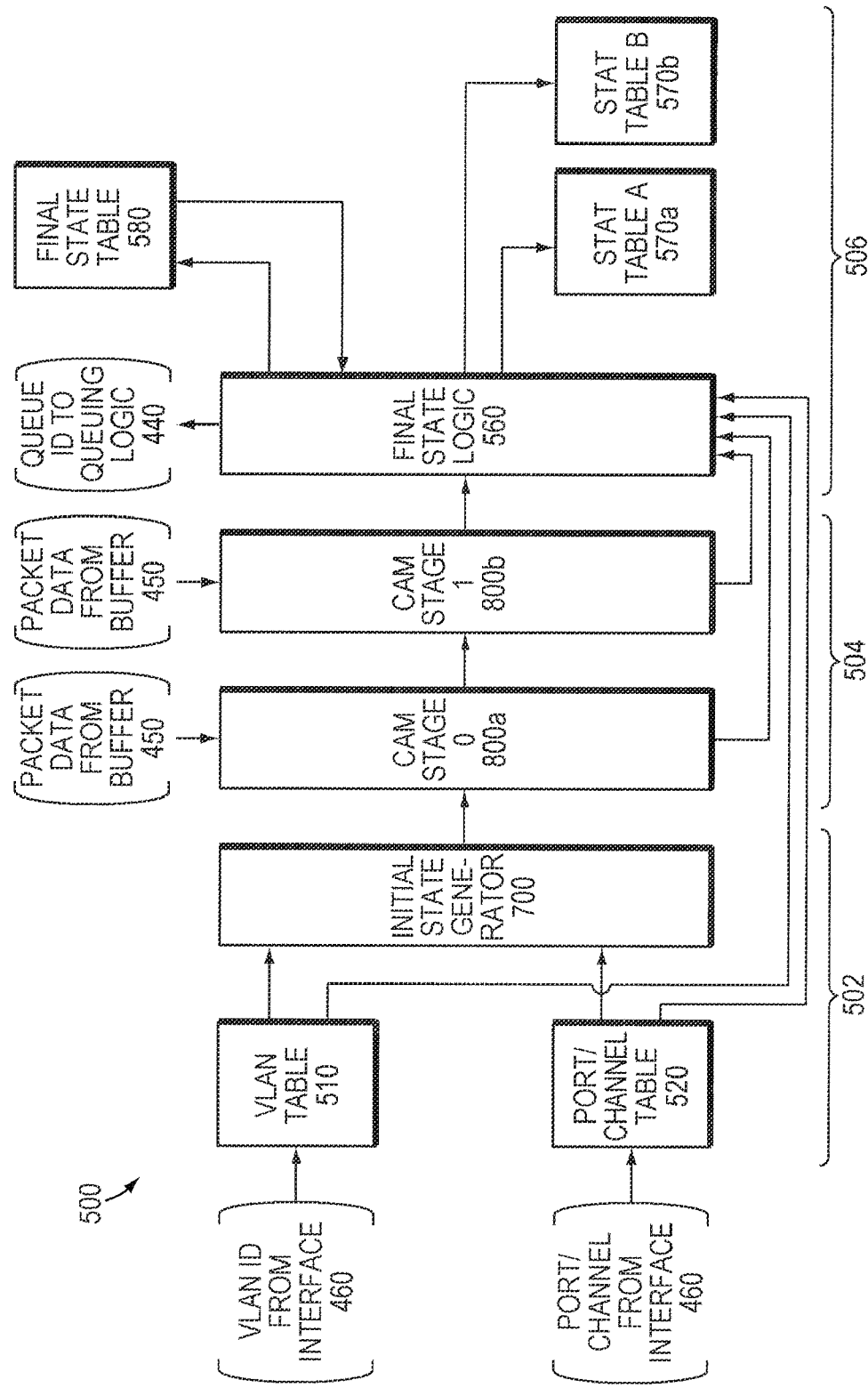
FIG. 5 is a schematic block diagram of a classification engine that may be advantageously used with the present invention.

FIG. 5 is a schematic block diagram of classification engine 500 comprising an initial classification stage 502, an intermediate classification stage 504, and a final classification stage 506. The initial classification stage 502 comprises a VLAN table 510, a port/channel table 520, and an initial state generator 700. The intermediate stage 504 comprises content-addressable memory (CAM) stages 800, and the final classification stage 506 comprises final state logic 560, statistics (STAT) tables 570 used to store statistics for future use, and a final state table 580. For illustrative purposes, classification engine 500 contains two CAM stages (i.e., 800a, 800b), however, it should be apparent to one skilled in the art that the inventive technique may be applied to other embodiments containing one or more CAM stages.

Figure 6:
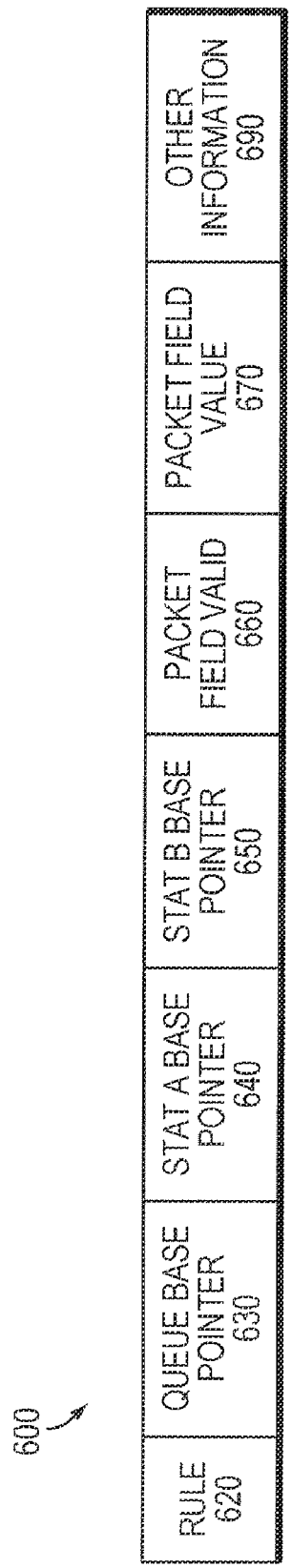
FIG. 6 is a schematic block diagram of a virtual local area network (VLAN) table and port/channel table entry that may be advantageously used with the present invention.

The VLAN 510 and port/channel 520 tables are data structures illustratively organized as tables containing one or more entries indexed by VLAN ID and destination port/channel ID, respectively. Illustratively, the VLAN, destination port, and destination channel IDs each may be a number or a character string value, that represent the VLAN, destination port, and destination channel associated with the packet, respectively. FIG. 6 is a schematic block diagram of a VLAN and port/channel table entry 600 that may be advantageously used with the present invention. Entry 600 comprises a rule field 620, a queue base pointer field 630, a STAT A base pointer field 640, a STAT B base pointer field 650, a packet field valid field 660, a packet field value field 670, and an other information field 690. The rule field 620 holds a value (e.g., an integer) that if illustratively is non-zero represents a rule associated with the index value, i.e., VLAN ID or port/channel ID, or if zero indicates that no rule is associated with the index value. The queue base pointer field 630 holds a base pointer of a queue ID, and the STAT A 630 and STAT B 650 base pointer fields hold base pointers of entries in the STAT A 570*a* and STAT B 570*b* tables, respectively. The packet field value field 670 holds a value that represents a criterion that may be used by the next classification stage to further classify the packet. This criterion may include, e.g., a value that represents a field within the packet or a value that represents information associated with the packet, such as a VLAN or port associated with the packet. The packet field valid field 660 holds a value that indicates whether the packet field value field 670 contains a valid value. Illustratively, field 660 is a one-bit field that if set to a one indicates the packet field value field 670 holds a valid value (i.e., is valid); otherwise, if set to zero indicates field 670 does not hold a valid value (i.e., the value in field 670 is not valid and considered undefined). The other information field 690 holds additional information associated with the entry 600 which may include information that controls the operation of the initial state generator 700, as well as a valid indicator that indicates whether the entry 600 contains valid information.

Figure 7:
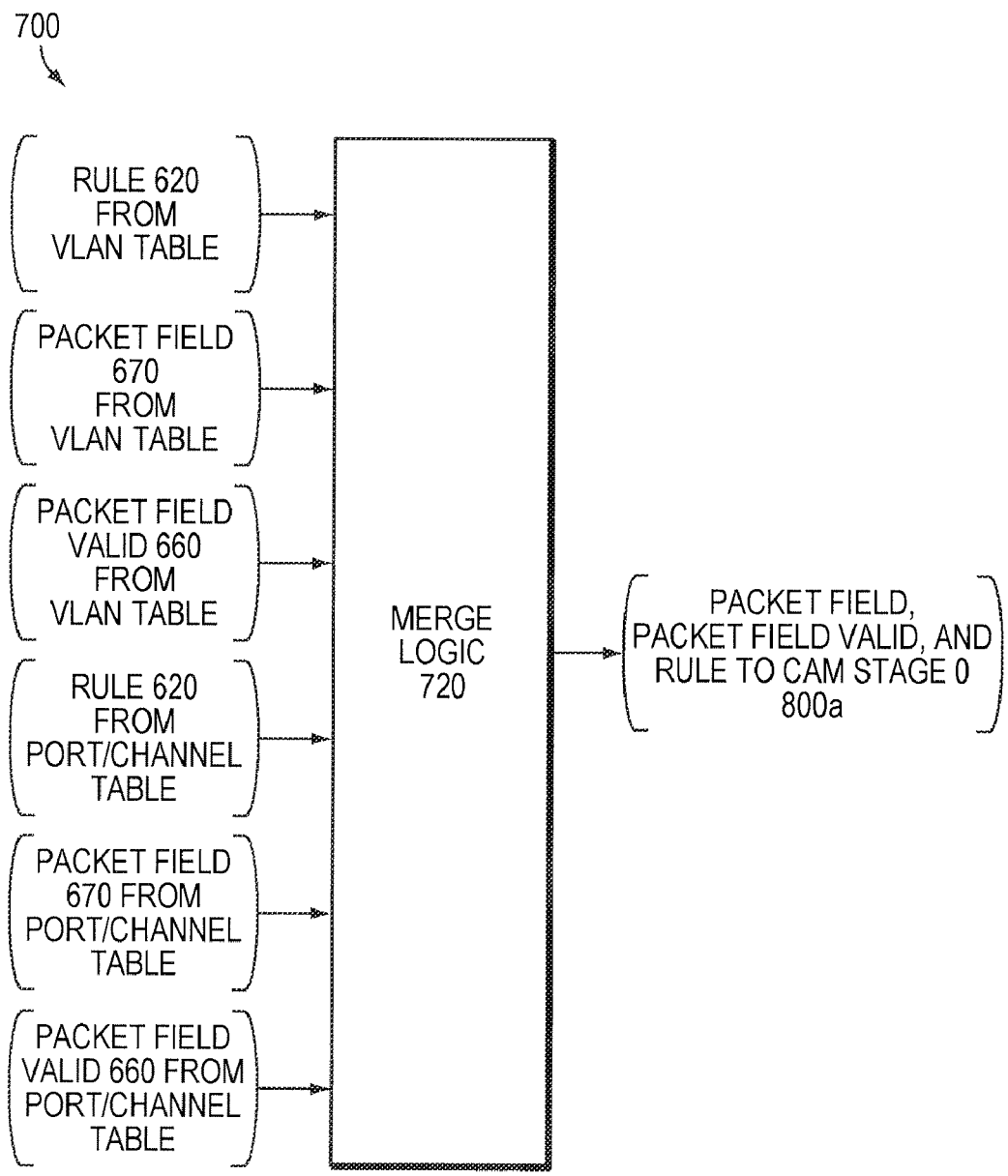
FIG. 7 is a high-level schematic block diagram of initial state generator logic that may be advantageously used with the present invention.

The rules 620, packet field values 670, and packet field valid values 660 from the selected VLAN and port/channel table entries are merged by the initial state generator 700 to generate a rule, packet field value and packet field valid value that are provided (input) to the next classification stage, e.g., CAM stage 0 800*a*. FIG. 7 is a high-level schematic block diagram of initial state generator logic 700. Initial stage generator logic 700 comprises merge logic 720 containing conventional logic configured to merge rules and criteria from the VLAN and port/channel tables and generate a rule, packet field value, and packet field valid value that are provided to the next classification stage.

In the illustrated embodiment the VLAN ID and port/channel ID in the packet is applied to the VLAN 510 and port/channel 520 tables, respectively, to select entries 600 in these tables that are associated with the packet. The rules 620 and packet field values 670 from the selected entries 600 are illustratively merged as follows: (i) if a rule is associated with the selected port/channel entry and no rule is associated with the selected VLAN table entry, the rule and packet field value associated with the selected port/channel entry's rule is used; (ii) if a rule is associated with the selected VLAN table entry and no rule is associated with a selected port/channel entry, the selected VLAN table entry's rule and packet field value is used; and (iii) if a rule is associated with both the selected port/channel table and VLAN table entries, the rule and packet field value associated with the selected port/channel table entry is used.

Specifically, merge logic 720 merges the rules 620, as described above, and generates the rule that is provided to the next classification stage. Likewise, merge logic 720 examines the packet field valid values 660 of the selected entries 600, merges the packet field values 670 of the selected entries 600 that indicate the packet field is valid, and generates the packet field value, as described above, that is provided to the next classification stage. In addition, the merge logic 720 merges the packet field valid values 660 and generates the packet field valid value that is also provided to the next classification stage.

A packet is classified at a CAM stage 800 using the rule and criterion (i.e., packet field value) from the previous stage. As noted above, the packet field value may represent a field within the packet, such as a field that contains a code point. As used herein, a code point is a specific value that has meaning to the network based on rules and policies associated with the network. For example, a differentiated services code point (DSCP) indicates to a network node, such as a router, how to prioritize, treat, and route a particular packet within the general traffic the node is receiving.

Figure 8:
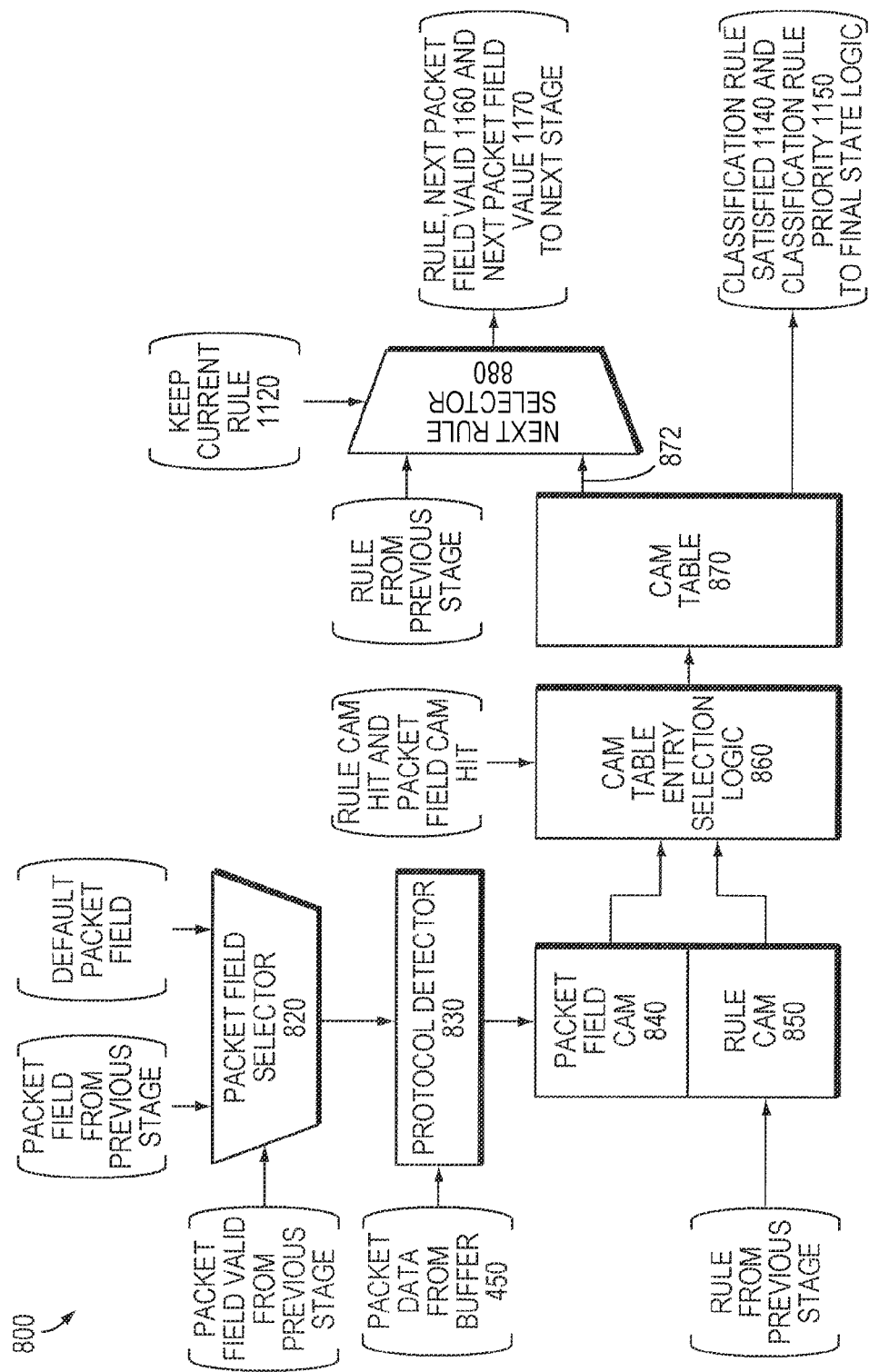
FIG. 8 is a schematic block diagram of a content-addressable memory (CAM) stage that may be advantageously used with the present invention.

FIG. 8 is a schematic block diagram of a CAM stage 800 that may be advantageously used with the present invention. CAM stage 800 comprises a packet field selector 820, a protocol detector 830, a packet field CAM 840, a rule CAM 850, CAM table entry selection logic 860, a CAM table 870, and a next rule selector 880. Packet field selector 820 and protocol detector 830 comprise logic that is configured to select and detect (decode) information associated with the packet, such as a field contained in the packet, and generate a value that is applied to the packet field CAM 840. Specifically, the value of the packet field valid field 660 from the previous stage configures the packet field selector 820 to select either the packet field value from the previous stage (e.g., packet field value 670) or a default packet field value. If the value of the packet field valid from the previous stage indicates the packet field is valid, the packet field value from the previous stage is selected; otherwise, the default packet field value is selected. The selected packet field value is provided to the protocol detector 830, which examines the contents of the field represented by the selected packet field in the packet and generates a packet field CAM value that is applied to the packet field CAM 840. In the illustrated embodiment, the packet field CAM value is generated by concatenating the selected packet field value with the contents of the field represented by the selected packet field value.

Figure 9:
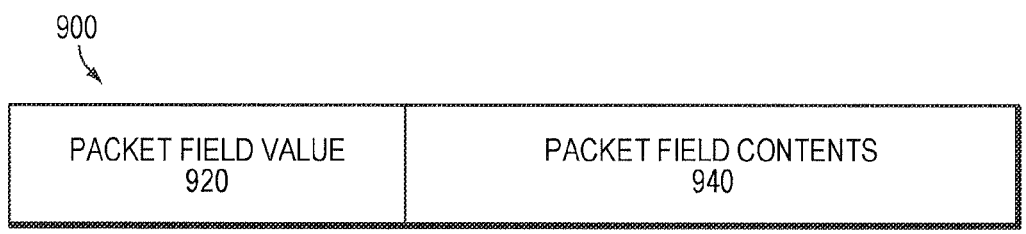
FIG. 9 is a schematic block diagram of a packet field CAM entry that may be advantageously used with the present invention.

Packet field CAM 840 and rule CAM 850 are illustratively conventional binary CAM devices each comprising 512 entries with each entry being accessible by a unique address and identifiable by a unique "hit" signal. FIG. 9 is a schematic block diagram of a packet field CAM entry 900 that may be advantageously used with the present invention. Entry 900 comprises a packet field value field 920 and a packet field contents field 940. The packet field value field 920 holds a value that represents, e.g., a field within the packet, and the packet field contents field 940 holds a value associated with the packet field value 920, e.g., the contents of a field represented by the packet field value 920. Illustratively, the packet field CAM value generated by the protocol detector 830 is applied to the packet field CAM 840. If the applied value matches a value contained in a packet field CAM entry 900, a packet field CAM hit signal corresponding to the matching entry is generated and delivered at an output of the packet field CAM 840.

Figure 10:
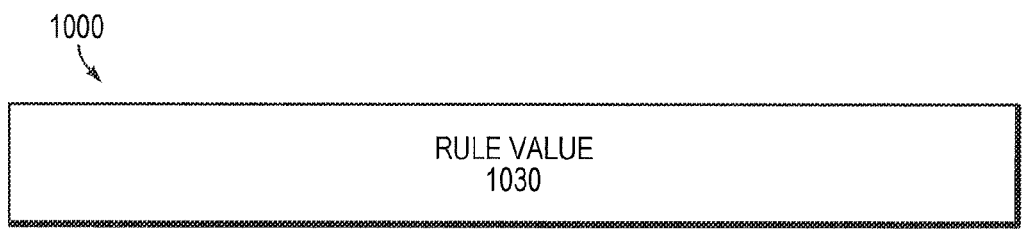
FIG. 10 is a schematic block diagram of a rule CAM entry that may be advantageously used with the present invention.

FIG. 10 is a schematic block diagram of a rule CAM entry 1000 that may be advantageously used with the present invention. Entry 1000 comprises a rule field 1030 that holds a rule value (e.g., an integer) that represents a rule associated with the entry 1000. Illustratively, the value of the rule from the previous stage, e.g., rule 620, is applied to the rule CAM 850. If the applied rule value matches a rule value 1030 contained in rule CAM entry 1000, a hit signal corresponding to the matching entry is generated and delivered at an output of the CAM 850.

In the preferred embodiment, when a packet field value and a rule value is applied to the packet field 840 and rule 850 CAMs, as described above, multiple matching entries in each CAM may be found. Each matching entry generates a unique hit signal corresponding to the matching entry which, as noted above, is delivered as an output of the CAM. Thus, for example, a 512-entry CAM may generate up to 512 unique hit signals that are delivered as an output of the CAM. Illustratively, these hit signals are transferred to the CAM table entry selection logic 860 which combines the outputs of the packet field CAM 840 and rule CAM 850, and generates an index value that is applied to CAM table 870. Specifically, logic 860 combines the outputs of CAMs 840 and 850 and if both CAMs generate a hit signal that indicates a matching entry at the same address in each CAM, logic 860 uses the hit signals from both CAMs to generate the index that is applied to the CAM table 870. Otherwise, the output of the rule CAM 850 is used to generate the index.

For example, assume a packet field value and a rule value are applied to CAM 840 and CAM 850, respectively, and that each CAM generates a hit signal indicating a match at location 255 within each respective CAM. The CAM table entry selection logic 860 combines the CAM hit signals, determines that each CAM has generated a signal indicating a match at location 255 within their respective CAMs, and generates a CAM table index value associated with the matching location 255.

In another example, assume the output generated by CAM 840 indicates the applied packet field value matches an entry at location 255 in CAM 840. Further, assume the output generated by CAM 850 indicates the applied rule field value matches only an entry at location 100 in CAM 850. Logic 860 combines the hit signals from both CAMs, determines that each CAM has located a matching entry at different locations, and generates a CAM table index value from the matching hit signal generated by the rule CAM 850, i.e., 100.

It should be noted that although in the illustrated embodiment the outputs of CAMs 840 and 850 are a 512-bit vector indicating matching CAM entry locations (hit values), CAMs that produce other forms of output can take advantage of the inventive technique. For example, in one embodiment of the invention, CAMs 840 and 850 are configured to produce addresses of the first matching CAM entry as an output. In this embodiment, logic 860 is configured to process the output of the CAMs as the first matching CAM entry, accordingly.

Figure 11:
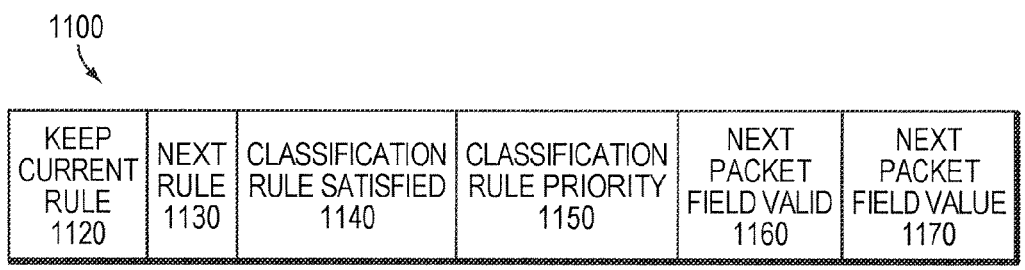
FIG. 11 is a schematic block diagram of a CAM lookup table entry that may be advantageously used with the present invention.

CAM table 870 is a data structure illustratively organized as a table comprising one or more entries. FIG. 11 is a schematic block diagram of a CAM table entry 1100 that may be advantageously used with the present invention. Entry 1100 comprises a keep current rule field 1120, a next rule field 1130, a classification rule satisfied field 1140, a classification rule priority field 1150, a next packet field valid field 1160, and a next packet field value field 1170.

The next rule field 1130 holds a value that represents a "next" rule that may be provided to the next classification stage, e.g., CAM stage 1 800b. The keep current rule field 1120 indicates whether a current rule (i.e., the rule from the previous stage) or the value in next rule field 1130 is provided to the next classification stage. Illustratively, this field 1120 is a one-bit field that if set to one indicates the current rule is provided; otherwise if set to zero, field 1120 indicates the value in the next rule field 1130 is provided. The classification rule satisfied field 1140 indicates whether the criteria defined in a particular classification rule has been met (satisfied). The classification rule priority field 1150 holds a value that indicates a priority associated with the satisfied classification rule. The values of the classification rule satisfied 1140 and classification rule priority 1150 fields are provided to the final state logic 560 and are used, along with other information by logic 560, to generate a final state table index. This index is applied to the final state table 580 to select a final state table entry associated with the packet.

The next packet field value field 1170 holds a value that represents a criterion that may be used by the next classification stage to further classify the packet. This criterion may include, e.g., a value that represents a field within the packet or a value that represents information associated with the packet, such as a VLAN or port associated with the packet. The packet field valid field 1160 holds an indicator that indicates whether the packet field value field 1170 contains a valid value. Illustratively, field 1160 is a one-bit field that if set to one indicates the packet field value field 1170 holds a valid value. Otherwise, if set to zero, field 1160 indicates the packet field value field 1170 does not hold a valid value (i.e., the value contained in the packet field value field 1170 is undefined).

The next rule selector 880 comprises logic that is configured to select a source for the rule that is provided to the next classification stage. Specifically, the keep current rule value 1120 from the selected CAM table entry 1100 configures the next rule selector 880 to select the source from either the (current) rule from the previous stage, e.g., rule 620, or the next rule 1130 contained in the selected CAM table entry 1100. As indicated above, if the keep current rule value 1120 is set to one, the current rule is selected; otherwise, the next rule 1130 from the selected CAM table entry 1100 is selected. The selected rule is provided to the next classification stage, e.g., CAM stage 1 800b.

Figure 12:
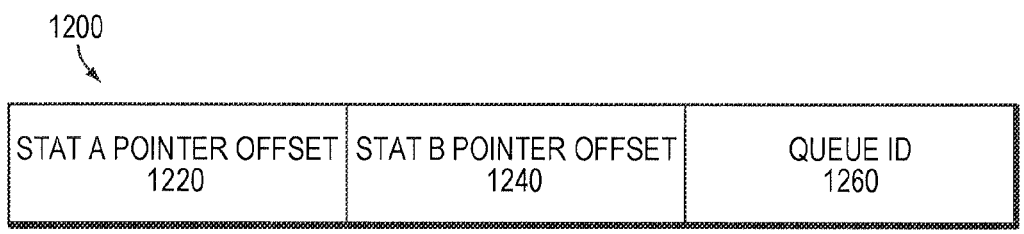
FIG. 12 is a schematic block diagram of a final state table entry that may be advantageously used with the present invention.

The final state table 580 (FIG. 5) is a data structure preferably organized as a table comprising one or more entries where each entry holds "final state" information associated with a classified packet. FIG. 12 is a schematic block diagram of a final state table entry 1200 that can be used with the present invention. Entry 1200 comprises a STAT A pointer offset field 1220, a STAT B pointer offset field 1240, and a queue identifier (ID) offset field 1260. The STAT A 1220 and STAT B 1240 pointer offset fields hold values that are combined with the STAT A 640 and STAT B 650 base pointers, respectively, to generate indices. These indices are used to select entries associated with the packet in the STAT A 570a and STAT B 570b tables. The queue ID offset field 1260 holds a queue ID offset that is combined with the queue base pointer 630 to generate a queue ID associated with the packet. This generated queue ID is used by the queuing logic 440 to select a calendar queue 442 associated with the classified packet.

Final state logic 560 comprises logic that generates a final state table index, the queue ID, and the STAT A table and STAT B table indices. Specifically, final state logic 560 processes the rule provided by the previous classification stage, e.g., CAM stage 1 800b, and the classification rule satisfied 1140 and classification rule priority 1150 information from the CAM stages 800, and generates a final state table index. The generated index is applied to the final state table 580 to select an entry 1200 associated with the packet. Final state logic 560 then combines the queue ID offset 1260 of the selected entry 1200 with the queue base pointers 630 provided by the selected VLAN and port/channel table entries 600 and generates a queue ID that is transferred to the queuing logic 440. In addition, final state logic 560 combines the STAT A 1220 and STAT B is 1240 offsets of the selected final table entry 1200 with the STAT A 640 and STAT B 650 base pointers, respectively, and generates the STAT A and STAT B table indices.

Figure 13:
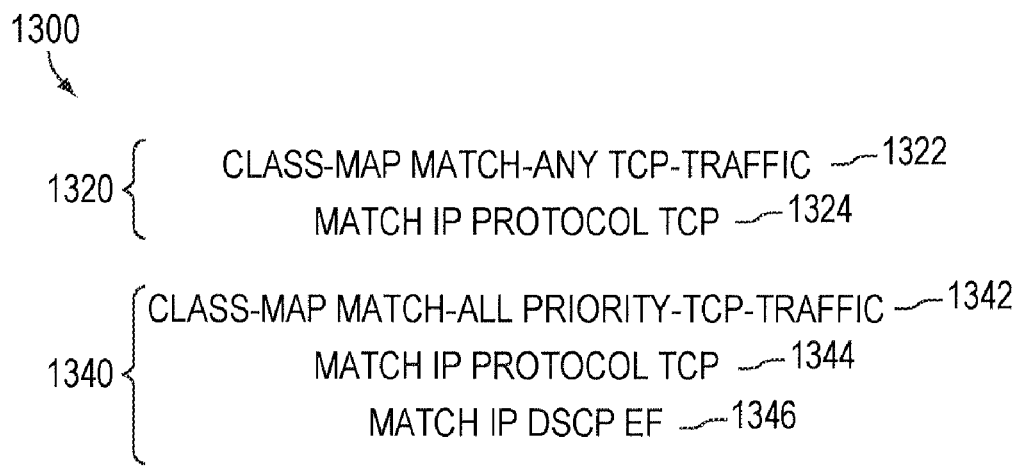
FIG. 13 is a exemplary set of classification rules that may be advantageously used with the present invention.

In the illustrated embodiment, classification engine 500 is configured to classify packets based on criteria defined by one or more classification rules. FIG. 13 illustrates an exemplary set of classification rules 1300 that may be used to configure classification engine 500. Each classification rule contains criteria that if met satisfy the particular classification rule and define a classification for the packet. For example, classification rule 1320 contains criteria that specify that any packet that specifies Transmission Control Protocol (TCP) in its IP protocol field is classified as "TCP-TRAFFIC." Likewise, classification rule 1340 contains criteria that specify that a packet containing TCP in its IP protocol field that also specifies "expedited forwarding" (EF) in its IP DSCP field is classified as "PRIORITY-TCP-TRAFFIC." In a typical arrangement, the set of rules 1300 are compiled to generate various values, e.g., rule and packet field values, that are used to configure the various tables and CAMs contained in classification engine 500.

Figure 14:
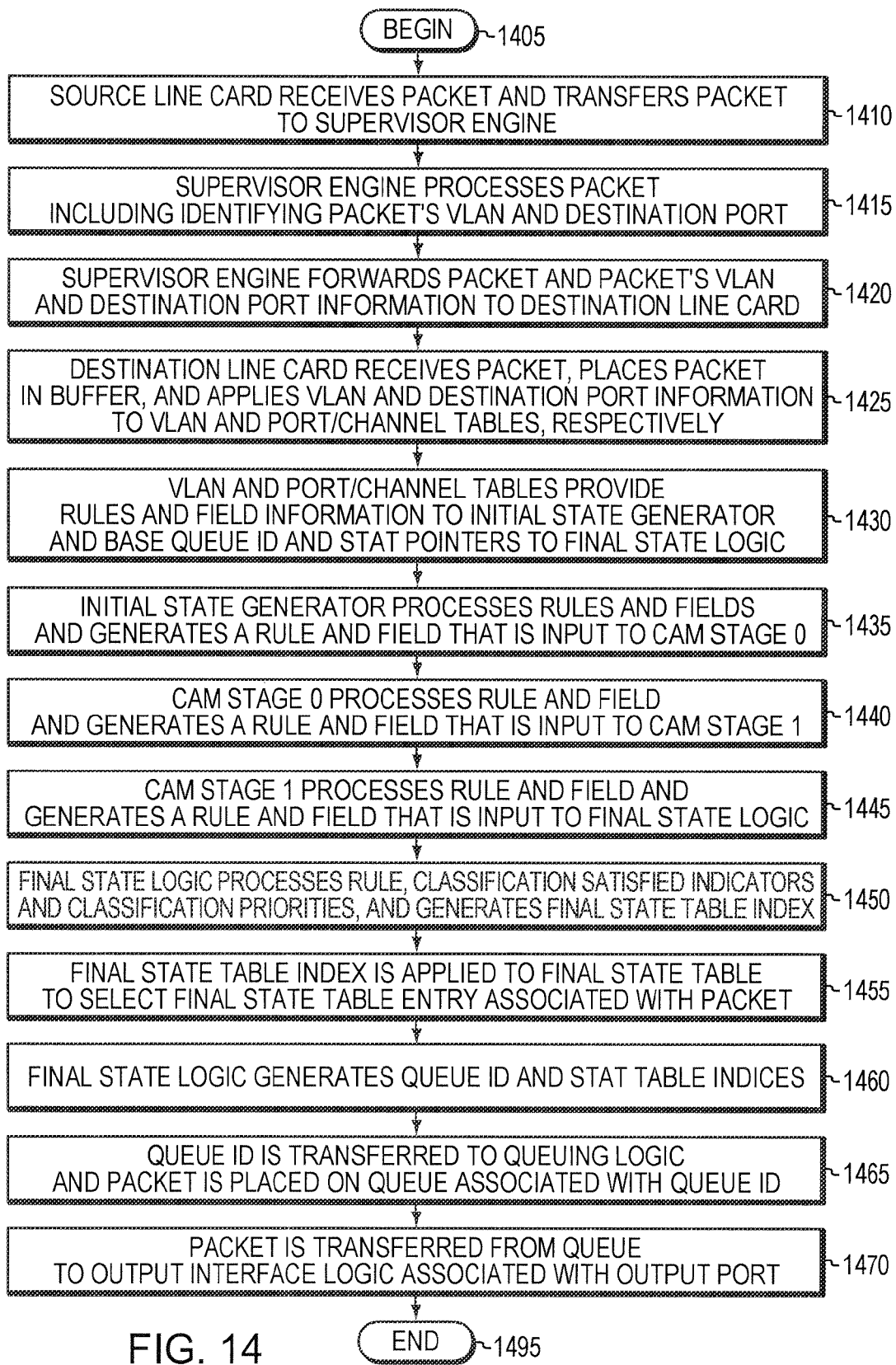
FIG. 14 is a flow chart of a series of steps that may be advantageously used to process a packet in accordance with the inventive technique.

FIG. 14 is a flow chart illustrating a series of steps that may be used to classify packets in accordance with the inventive technique. Suppose classification engine 500 is configured to process packets in accordance with classification rules 1300 and that rule 1340 has a higher priority associated with it than rule 1320 (i.e., rule 1340 takes precedence over rule 1320). At Step 1410 line card 400 receives a packet and transfers the packet to the supervisor engine 300. Assume the packet specifies "expedited forwarding" in its DSCP field and TCP in its IP protocol field. The packet is received at input interface 420, which transfers the packet to the backplane interface 460. The backplane interface 460, in turn, transfers the packet over backplane 220 to the supervisor engine 300.

At Step 1415, the supervisor engine 300 receives the packet at interface logic 360, which places the packet in packet memory 370 and notifies the processor 320 that the packet has been placed in the packet memory 370. The processor 320 accesses the packet through system controller 330 and processes it by applying information contained in the packet to the FIBs in memory 340 to determine (identify) a destination port and forwarding information associated with the packet. Assume the forwarding information includes a VLAN ID and destination port ID associated with the packet.

Next, at Step 1420, the supervisor engine 300 forwards the packet and the packet's forwarding information over backplane 220 to a destination line card 400 containing the destination port. The line card 400 receives the packet and the forwarding information at backplane interface 460, places the packet in packet buffer 450, and applies the packet's VLAN and destination port IDs contained in the forwarding information to the VLAN 510 and port/channel 520 tables, respectively, as indicated at Step 1425.

Next, at Step 1430, the VLAN 510 and port/channel 520 tables provide rules and packet field information that are provided to the initial state generator 700, and STAT A and STAT B base pointers that are provided to the final state logic 560. Specifically, the packet's VLAN ID applied to the VLAN table 510 and the packet's destination port ID applied to the port/channel table 520 select entries 600 in these tables associated with the packet's VLAN and destination port IDs, respectively. The rule 620, packet field valid 660, and packet field value 670 contained in each selected entry 600 are then provided to the merge logic 720 (FIG. 7) contained in the initial state generator 700. Moreover, the STAT A 640 and STAT B 650 base pointers contained in each selected entry 600 are provided to the final state logic 560.

The initial state generator 700 processes the rule and packet field information and generates rule and field information that are provided to the next classification stage, i.e., CAM stage 0 800*a* (Step 1435). Specifically, merge logic 720 combines (merges) the rules 620 from the selected VLAN and port/channel table entries, as described above, to generate a rule that is provided to CAM stage 0 800*a*. Likewise, merge logic 720 examines the contents of the packet field valid fields 660 from the selected VLAN and port/channel table entries 600 and determines if they indicate the packet field values 670 from the selected entries are valid. If so, the merge logic 720 combines (merges) the contents of the valid packet field values 670 and the packet field valid fields 660, as described above, to generate a packet field value and packet field valid value, respectively, that are also provided to CAM stage 0 800*a*. Assume the merge logic generates a packet field valid value that indicates "valid" and a packet field value that enables the protocol detector 830 to examine the packet to determine if the packet specifies TCP in its IP protocol field.

Next, at Step 1440, CAM stage 0 800*a* processes the rule and packet field value generated by the initial state generator 700 and generates a rule and packet field value that are provided to the next classification stage, e.g., CAM stage 1 800*b*. Specifically, the packet field and packet field valid values generated by the initial state generator 700 and a default packet field value are provided to packet field selector 820. As noted above, the generated packet field valid value from the previous stage, e.g., the initial state generator 700, provided to selector 820 determines whether the generated packet field value from the previous stage or the default packet field value is provided to the protocol detector 830. As indicated above, since the packet field valid field indicates "valid," the selector 820 is configured to supply the generated packet field value from the merge logic 720 (i.e., a value used to determine if the packet's IP protocol field specifies TCP) to the protocol detector 830.

Using the generated packet field value, the protocol detector 830, examines the contents of a field in the data packet represented by the generated packet field value. Using the contents along with the generated packet field value, the protocol detector 830 generates a CAM data value that is applied to packet field CAM 840. For example, assume the generated packet field value is a value that represents the IP protocol field within the packet from which it can be determined if the packet specifies TCP. The protocol detector 830 examines the contents of the field represented by the generated packet field value, e.g., the IP protocol field, and generates a CAM data value by, e.g., concatenating the generated packet field value with the contents of the examined field. The generated CAM data value is applied to the packet field CAM 840.

The packet field CAM 840 searches its entries 900 and determines if an entry 900 matches the applied CAM data value. If a matching entry is found, CAM 840 generates an address associated with the matching entry and a "hit" value that are provided to selection logic 860. The generated rule from the initial state logic 700 is applied to the rule CAM 850 contained in CAM stage 0 800*a*. Likewise, the rule CAM 850 searches its entries 1000 and determines if an entry 1000 matches the applied generated rule and if so, generates an address associated with the matching entry and a "hit" value that are also provided to the selection logic 860.

The selection logic 860 combines the hit and address values from the rule and packet field CAMs, and generates a CAM table index, which is applied to CAM table 870 to select an entry 1100 associated with the packet. Assume the selected entry 1100 is associated with match statement 1324 and classification rule 1320. Since the matching criteria associated with the classification rule 1320 (i.e., "MATCH-ANY" and "MATCH IP PROTOCOL TCP") have been met, the classification satisfied indicator 1140 indicates "satisfied" and the classification priority value 1150 indicates a priority value associated with classification rule 1320. The classification satisfied indicator 1140 and the classification priority value 1150 are transferred to the final state logic 560.

The (current) rule from previous stage, e.g., initial state generator 770, and the contents of the keep current rule 1120 and next rule 1130 fields of the selected entry 1100 are transferred to selector 880. The contents of the keep current rule field 1120 configures selector 880 to select either the current rule or the contents of the next rule field 1130 (next rule).

Assume the keep current rule 1120 value in the selected entry 1100 configures selector 880 to select the next rule 1130. The selected rule 1130 and the contents of the next packet field valid 1160 and next packet field value 1170 contained in the selected entry 1100 are provided to the next classification stage, i.e., CAM stage 1 800*b*.

At Step 1445, CAM stage 1 800*b* processes the packet field valid, packet field, and rule from the previous classification stage, i.e., CAM stage 0 800*a*, in a manner as described above and selects a CAM table entry 1100 in its CAM table 870. Assume the selected entry 1100 is associated with match statement 1346 and classification rule 1340. Moreover, assume the selected entry contains (i) a "do not keep the current rule" value in the keep current rule field 1120, (ii) a value that represents a rule associated with the combination of match statements 1344 and 1346 in the next rule field 1130, (iii) a value that indicates the criteria for classification rule 1340 is satisfied in the classification satisfied field 1140, (iv) a value that indicates classification rule 1340's priority in the classification priority field 1150, (v) a value that indicates "the next packet field value field is not valid" in the next packet field valid field 1160, and (vi) an undefined value in the next packet field value field 1170.

At Step 1450, the final state logic 560 combines the rule from CAM stage 1 800*b* with the classification satisfied indicators 1140 and classification priority values 1150 from CAM stages 800*a* and 800*b*, and generates a final state table index that is applied to the final state table 580 to select a final state table entry 1200 associated with the packet (Step 1455). Specifically, logic 560 examines the classification satisfied indicators 1140 and the classification priority values 1150 and chooses the classification priority value of the highest priority satisfied classification rule and combines the priority with the final rule to generate the final state table index. As indicated above, since classification rule 1340 is higher in priority than rule 1320, the classification priority value 1150 associated with rule 1340 is combined with the final rule to generate the final state table index. The generated index is then applied to the final state table entry to select an entry 1200.

Using information in the selected entry 1200, the final state logic 560 generates STAT A and STAT B table indices and a queue ID associated with the packet (Step 1460). Specifically, final state logic 560 combines the queue base pointers 630 from the selected VLAN and port/channel table entries 600 with the queue ID offset 1260 from the selected final table entry 1200 to generate a queue ID. Moreover, logic 560 combines the STAT A base pointers 640 from the selected VLAN and port/channel table entries 600 with the STAT A offset 1220 from the selected final table entry 1200 to generate a STAT A index value. Likewise, logic 560 combines the STAT B base pointers 650 from the selected VLAN and port/channel table entries with the STAT B offset 1240 from the selected final table entry to generate a STAT B index value. The STAT A and STAT B indices are applied to the STAT A and STAT B tables 570, respectively, to select entries in these tables associated with the packet.

At Step 1465, the queue ID generated by the final state logic 560 is transferred to the queuing logic 440 and the packet is then transferred from the packet buffer to the calendar queue 442 associated with the queue ID generated by the final state logic 560. When the packet reaches the head of the queue, the packet is transferred from the queue 442 to the output interface logic 430 associated with the destination port for transfer onto the network (Step 1470). The sequence ends at Step 1495.

Although the above-described embodiment of the invention describes the invention as implemented using various hardware devices, this is not intended to be a limitation of the invention. Rather, the invention may be implemented in whole or in part using software. For example, the functions performed by the various classification stages (e.g., initial state generator, CAM stages, and final state logic) may be implemented as software routines or functions containing computer executable instructions for execution on a processor, such as processor. Moreover, it will be apparent to those skilled in the art that such computer executable instructions may be stored in a tangible computer readable medium, such as DRAM or other conventional computer readable mediums such as a disk.

It should be further noted that in the illustrated embodiment, the inventive technique performs classification of packets at the egress stage, however, this is not intended to be a limitation of the invention. The inventive technique may be employed at other times when the packet is processed, such as classifying a packet at the ingress stage. For example, the inventive technique may be employed to classify a packet to generate information associated with the packet prior to generating a forwarding decision associated with the packet.

The foregoing description has been directed to specific embodiments of this invention. It will be apparent that other variations and modifications may be made to the described embodiments, with the attainment of some or all of their advantages. Therefore, it is an object of the appended claims to cover all such variations and modifications as come within the true spirit and scope of the invention.

What is claimed is:

1. A method for classifying packets in an intermediate node, the method comprising the steps of:
   generating a first rule and first criterion using information associated with a packet at an initial classification stage of a classification engine in the node, wherein the first rule includes an indication of a first criteria used to determine if the first rule is satisfied, and wherein the first criterion includes a first value derived from the information associated with the packet and that is to be compared to the first criteria;
   applying the first rule and first criterion to a first intermediate classification stage of the engine that includes one or more content addressable storage memories (CAMs) to generate a second rule and a second criterion, wherein the second rule includes an indication of a second criteria used to determine if the second rule is satisfied, and wherein the second criterion includes a second value to be compared to the second criteria;
   generating a final rule using one or more additional intermediate classification stages of the engine using the second rule and the second criterion, wherein the final rule includes an indication of a third criteria used to determine if the final rule is satisfied;
   generating an identifier associated with the packet at a final classification stage of the engine using the final rule; and
   using the identifier to classify the packet.

2. The method as defined in claim 1 wherein the information associated with the packet includes a destination port identifier (ID) and virtual local area network (VLAN) ID.

3. The method as defined in claim 2 further comprising the steps of:
   selecting an entry in a port/channel table using the destination port ID;
   selecting an entry in a VLAN table using the VLAN ID;
   merging a rule contained in the selected port/channel table entry with a rule contained in the selected VLAN table entry to generate the first rule; and merging a criterion contained in the selected port/channel table entry with a criterion contained in the selected VLAN table entry to generate the first criterion.

4. The method as defined in claim 1 wherein the first criterion includes a packet field value that represents a field within the packet.

5. The method as defined in claim 4 comprising the steps of:
examining the contents of the field represented by the packet field value within the packet;
generating a CAM value using the contents of the field and the packet field value; and
locating a matching packet field CAM entry by applying the generated value to a packet field CAM.

6. The method as defined in claim 5 comprising the step of:
locating a matching rule CAM entry by applying the first rule to a rule CAM.

7. The method as defined in claim 6 comprising the steps of:
generating a packet field CAM output;
generating a rule CAM output; and
generating a CAM table index by combining the packet field CAM output with the rule CAM output; and
selecting a CAM table entry using the CAM table index.

8. The method as defined in claim 7 comprising the step of:
applying a rule contained in the selected CAM table entry to a second rule CAM.

9. The method as defined in claim 7 comprising the step of:
applying a packet field value contained in the selected CAM table entry to a second packet field CAM.

10. The method as defined in claim 7 comprising the step of:
generating the final rule from a rule contained in the selected CAM table.

11. The method as defined in claim 1 comprising the steps of:
generating one or more classification rule satisfied values;
generating one or more classification rule priority values; and
providing the generated classification rule satisfied values and classification rule priority values to the final classification stage.

12. The method as defined in claim 11 comprising the steps of:
generating a final state table index by combining the classification rule satisfied values, classification rule priority values, and final rule; and
selecting a final state table entry associated with the packet using the final state table index.

13. The method as defined in claim 12 comprising the steps of:
generating the identifier using a queue ID contained in the selected final state table entry.

14. The method as defined in claim 1 wherein the step of applying further comprises:
applying the first rule and first criterion to the one or more CAMs to generate the second rule and the second criterion.

15. A classification engine system comprising:
an initial classification stage configured to generate a first rule and a first criterion using information associated with a packet, wherein the first rule includes an indication of a first criteria used to determine if the first rule is satisfied, and wherein the first criterion includes a first value derived from the information associated with the packet and that is to be compared to the first criteria;
a first intermediate classification stage that includes one or more content addressable storage memories (CAMs), coupled to the initial classification stage and configured to generate a second rule and a second criterion using the first rule and the first criterion, wherein the second rule includes an indication of a second criteria used to determine if the second rule is satisfied, and wherein the second criterion includes a second value to be compared to the second criteria;
one or more additional intermediate classification stages that include one or more CAMs, configured to receive the second rule and the second criterion and to generate a final rule, wherein the final rule includes an indication of a third criteria used to determine if the final rule is satisfied; and
a final classification stage coupled to the intermediate classification stages and configured to generate an identifier associated with the packet using the final rule.

16. The system as defined in claim 15 wherein the information associated with the packet includes a destination port identifier (ID) and virtual local area network (VLAN) ID.

17. The system as defined in claim 16 comprising:
a port/channel table containing one or more entries wherein each entry contains a rule and a criterion;
a VLAN table containing one or more entries wherein each entry contains a rule and a criterion; and
merge logic coupled to the port/channel table and the VLAN table and configured to merge the rule and the criterion contained in a selected port/channel table entry with the rule and the criterion contained in a selected VLAN table entry, respectively, to generate a first rule and first criterion.

18. The system as defined in claim 15 wherein the first criterion includes a packet field value that represents a field within the packet.

19. The system as defined in claim 18 comprising:
a packet field CAM containing one or more packet field CAM entries; and
a protocol detector coupled to the packet field CAM and configured to examine the contents of the field represented by the packet field value and using the contents, generate a packet field CAM value;
wherein the packet field CAM value is applied to the packet field CAM to locate one or more matching packet field CAM entries.

20. The system as defined in claim 18 comprising:
a rule CAM containing one or more rule CAM entries;
wherein the first rule is applied to the rule CAM to locate a matching rule CAM entry.

21. The system as defined in claim 15 wherein the intermediate classification stage is further configured to apply the first rule and first criterion to the one or more CAMs of the first intermediate classification stage to generate the second rule and the second criterion.

22. An apparatus comprising:
a classification engine;
means for generating a first rule and first criterion using information associated with a packet at an initial classification stage of the classification engine, wherein the first rule includes an indication of a first criteria used to determine if the first rule is satisfied, and wherein the first criterion includes a first value derived from the information associated with the packet and that is to be compared to the first criteria;
means for applying the first rule and first criterion to a first intermediate classification stage of the classification engine that includes one or more content addressable storage memories (CAMs), to generate a second rule and a second criterion, wherein the second rule includes an indication of a second criteria used to determine if the second rule is satisfied, and wherein the second criterion includes a second value to be compared to the second criteria;

means for generating a final rule using one or more additional intermediate classification stages of the classification engine using the second rule and the second criterion, wherein the final rule includes an indication of a third criteria used to determine if the final rule is satisfied; and means for generating an identifier associated with the packet at a final stage of the classification engine using the final rule.

23. A non-transitory computer readable medium comprising computer executable instructions for execution in a processor for:

generating a first rule and first criterion using information associated with a packet at an initial classification stage of a classification engine in a node, wherein the first rule includes an indication of a first criteria used to determine if the first rule is satisfied, and wherein the first criterion includes a first value derived from the information associated with the packet and that is to be compared to the first criteria;

applying the first rule and first criterion to a first intermediate classification stage of the classification engine that includes one or more content addressable storage memories (CAMs), to generate a second rule and a second criterion, wherein the second rule includes an indication of a second criteria used to determine if the second rule is satisfied, and wherein the second criterion includes a second value to be compared to the second criteria;

generating a final rule using one or more additional intermediate classification stages of the classification engine using the second rule and the second criterion, wherein the final rule includes an indication of a third criteria used to determine if the final rule is satisfied;

generating an identifier associated with the packet at a final classification stage of the classification engine using the final rule; and using the identifier to classify the packet.

24. An apparatus comprising:

an initial classification stage of a classification engine configured to generate a first rule and a first criterion using information associated with a packet, the first rule indicating a first criteria used to determine if the first rule is satisfied, the first criterion indicating a field of the packet;

two or more content-addressable memory (CAM) stages of the classification engine, a first CAM stage of the two or more CAM stages configured to receive the first rule and the first criterion, and to apply the first rule to contents of the field of the packet indicated by the first criterion to generate a second rule and a second criterion, the second rule indicating a second criteria used to determine if the second rule is satisfied, the second criterion indicating another field of the packet, a second CAM stage of the two or more CAM stages configured to receive the second rule and the second criterion, and to apply the second rule to contents of the field of the packet indicated by the second criterion; and a final classification stage of the classification engine coupled to the two or more CAM stages, the final classification stage configured to receive a final rule from one of the two or more CAM stages, the final rule indicating a final criteria used to determine if the final rule is satisfied, the final classification stage to use the final rule to generate a queue identifier (ID) for use with the packet.

25. The apparatus as defined in claim 24 wherein the information associated with the packet includes a destination port identifier (ID) and virtual local area network (VLAN) ID.

26. The apparatus as defined in claim 25 wherein the initial classification stage comprises:

a port/channel table containing one or more entries wherein each entry contains a rule and a criterion;

a VLAN table containing one or more entries wherein each entry contains a rule and a criterion; and merge logic coupled to the port/channel table and the VLAN table and configured to merge the rule and the criterion contained in a selected port/channel table entry with the rule and the criterion contained in a selected VLAN table entry, respectively, to generate the first rule and the first criterion.

27. The apparatus as defined in claim 24 wherein the first CAM stage comprises:

a packet field CAM containing one or more packet field CAM entries;

a protocol detector coupled to the packet field CAM and configured to examine the contents of the field indicated by the first criterion and to use the contents to generate a packet field CAM value; and wherein the packet field CAM value is applied to the packet field CAM to locate one or more matching packet field CAM entries.

28. The apparatus as defined in claim 27 wherein the first CAM stage further comprises:

a rule CAM containing one or more rule CAM entries;

wherein the first rule is applied to the rule CAM to locate a matching rule CAM entry.

29. A method comprising:

generating a first rule and a first criterion using information associated with a packet, the first rule indicating a first criteria used to determine if the first rule is satisfied, the first criterion indicating a field of the packet;

providing the first rule and the first criterion to a first content-addressable memory (CAM) stage of two or more CAM stages of a classification engine;

applying the first rule, by the first CAM stage, to contents of the field of the packet indicated by the first criterion;

generating a second rule and a second criterion at the first CAM stage, the second rule indicating a second criteria used to determine if the second rule is satisfied, the second criterion indicating another field of the packet;

providing the second rule and the second criterion to a second CAM stage of the two or more CAM stages of the classification engine;

applying the second rule, by the second CAM stage, to contents of the field of the packet indicated by the second criterion;

providing a final rule to a final classification stage of the classification engine, the final rule indicating a final criteria used to determine if the final rule is satisfied; and using the final rule to generate a queue identifier (ID) for use with the packet.

30. The method as defined in claim 29 wherein the information associated with the packet includes a destination port identifier (ID) and virtual local area network (VLAN) ID.

31. The method as defined in claim 30 wherein generating a first rule comprises:

selecting an entry in a port/channel table using the destination port ID;

selecting an entry in a VLAN table using the VLAN ID;

merging a rule contained in the selected port/channel table entry with a rule contained in the selected VLAN table entry to generate the first rule; and merging a criterion contained in the selected port/channel table entry with a criterion contained in the selected VLAN table entry to generate the first criterion.

32. The method as defined in claim 29 wherein applying the first rule comprises:

examining the contents of the field of the packet indicated by the first criterion;

generating a CAM value using the contents of the field; and locating a matching packet field CAM entry by applying the generated value to a packet field CAM.

33. The method as defined in claim 32 wherein applying the first rule comprises:

locating a matching rule CAM entry by applying the first rule to a rule CAM.

* * * * *